United States Patent

Bandel et al.

[11] Patent Number: 5,391,338
[45] Date of Patent: Feb. 21, 1995

[54] MANUFACTURE OF A CARBON PARTICLE FILTER

[75] Inventors: Wolfgang Bandel, Leinfelden-Echterdingen; Helmut Daudel, Schorndorf; Gerhard Griebling, Habnenweg 14, 5431 Mogendorf; Alfred Normann, Alsbach; Friedrich Sperling, Montabaur, all of Germany

[73] Assignees: Daimler-Benz AG; Gerhard Griebling, both of Germany; a part interest

[21] Appl. No.: 315,903
[22] Filed: Feb. 27, 1989

[30] Foreign Application Priority Data

Feb. 26, 1988 [DE] Germany ............ 3806131.7

[51] Int. Cl.$^6$ .................................... C04B 38/06
[52] U.S. Cl. .......................... 264/59; 264/44; 264/60
[58] Field of Search .................. 264/59, 44, 60

[56] References Cited

U.S. PATENT DOCUMENTS

| | | | |
|---|---|---|---|
| 3,338,995 | 8/1967 | Sowards | 264/59 |
| 3,533,753 | 10/1970 | Berger | 264/59 |
| 4,652,286 | 3/1987 | Kusuda et al. | 55/523 |
| 4,667,469 | 5/1987 | Abthoff | 60/311 |

FOREIGN PATENT DOCUMENTS 3444472 2/1986 Germany.

*Primary Examiner*—James Derrington
*Attorney, Agent, or Firm*—Evenson, McKeown, Edwards & Lenahan

[57] ABSTRACT

A process is described for manufacturing a carbon particle filter having a plurality of channels which extend in the exhaust gas flow direction and which are alternatingly sealed at the upstream and downstream end of a porous ceramic material. To minimize the time required for producing the channels, a slip-like ceramic starting material is applied to a fabric having longitudinal threads corresponding to the size location and position of the channels and extending at least in the longitudinal direction of the filter. The carbon filter body is then formed by layering the coated fabric and thereafter in the course of the ceramic firing of the carbon filter body, its inlet and outlet channels are formed by burning away the longitudinal threads.

33 Claims, 4 Drawing Sheets

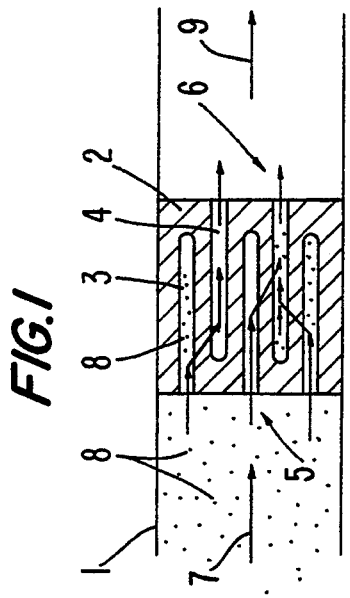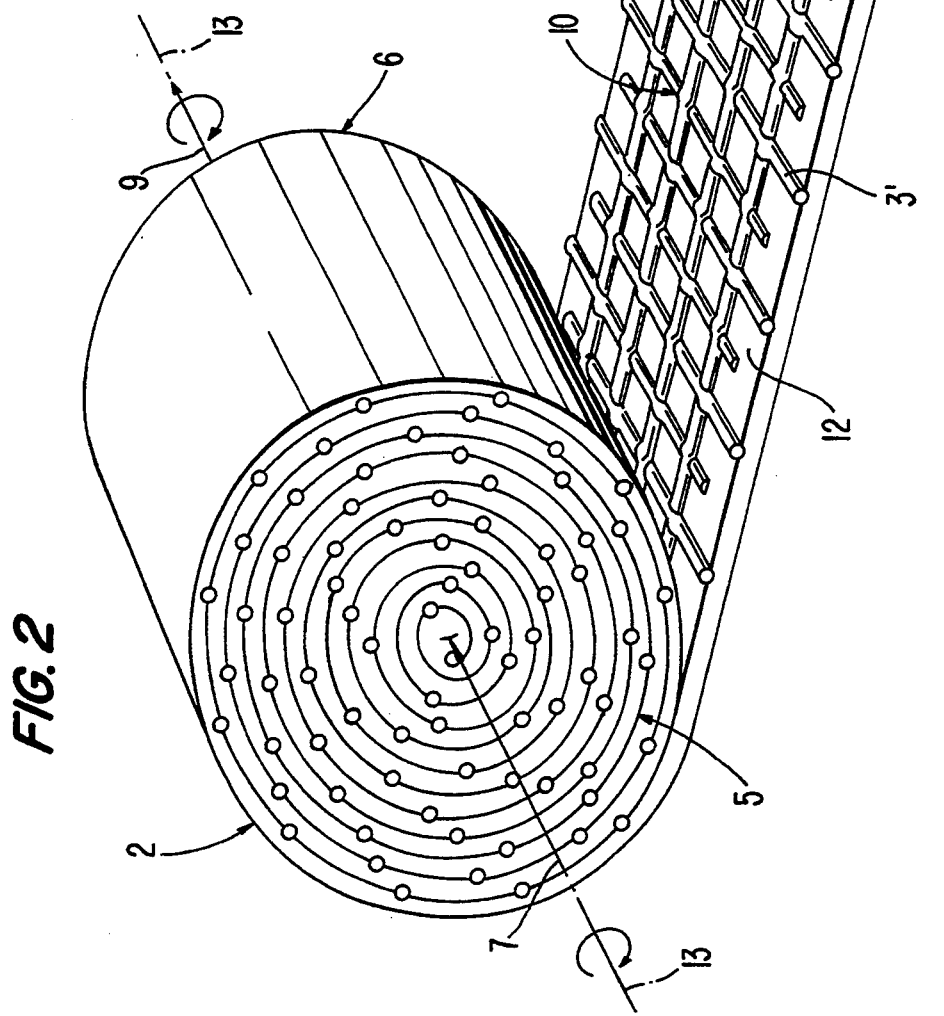

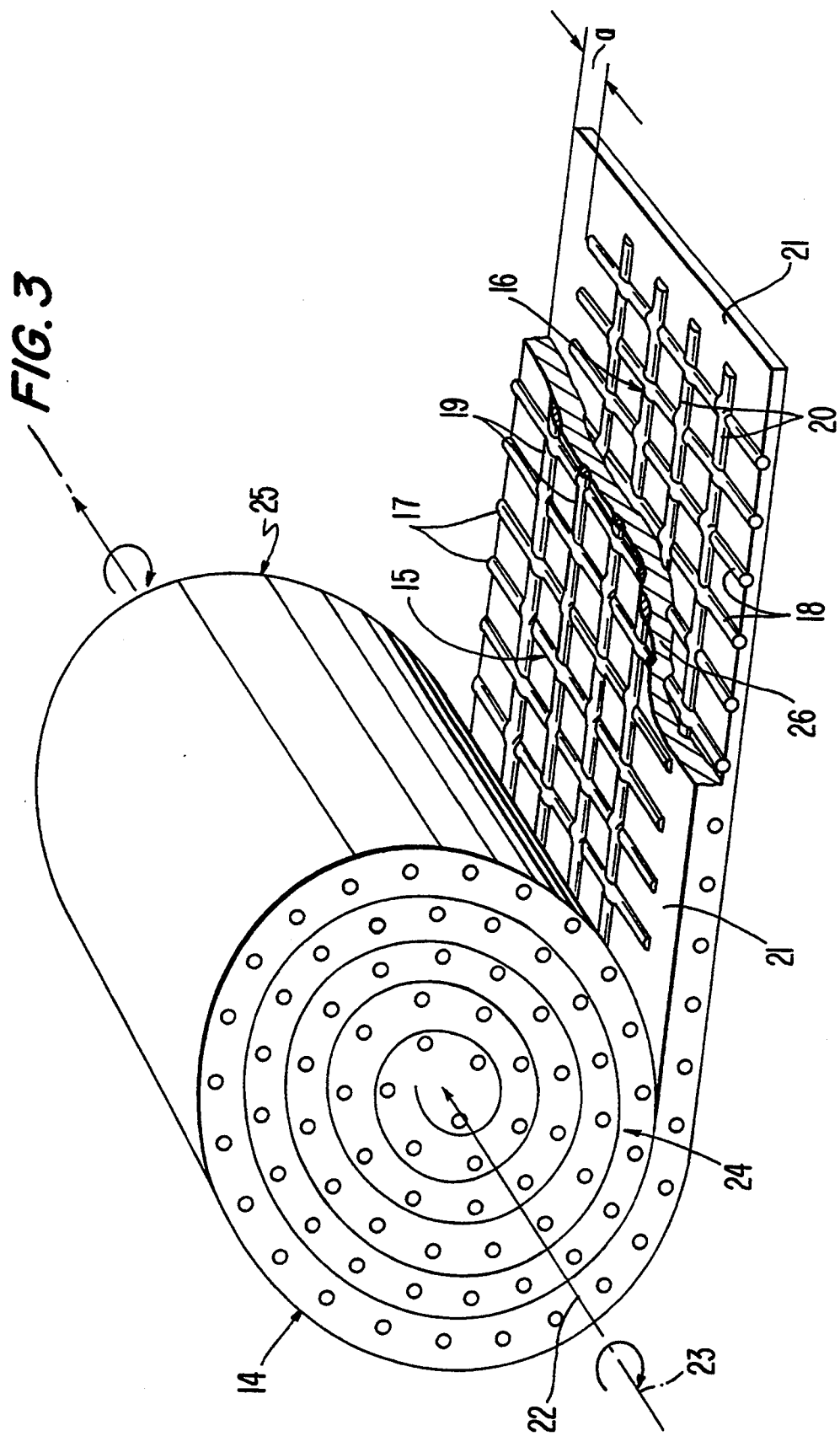

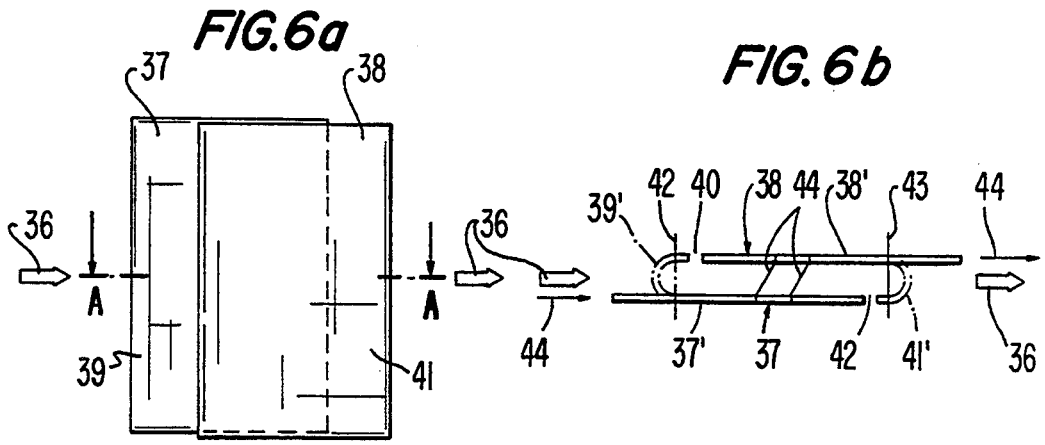
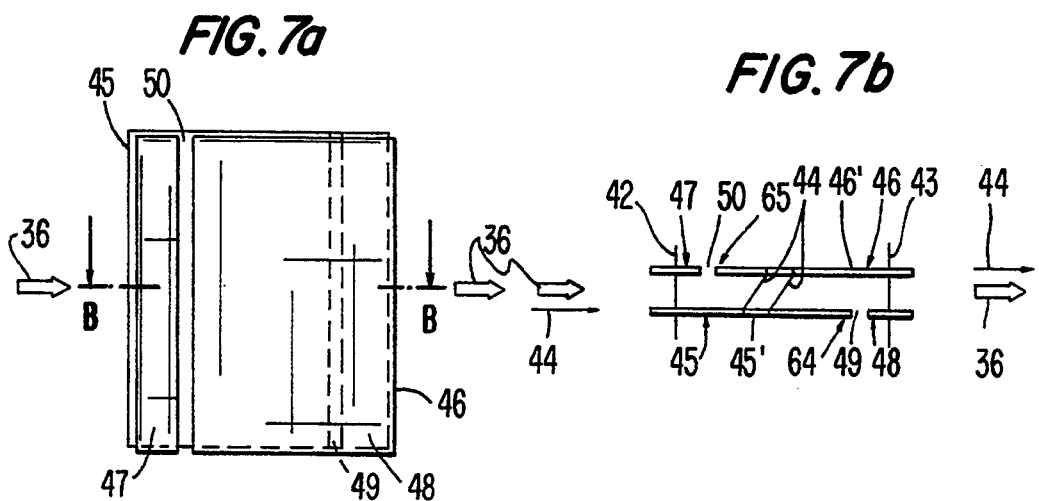
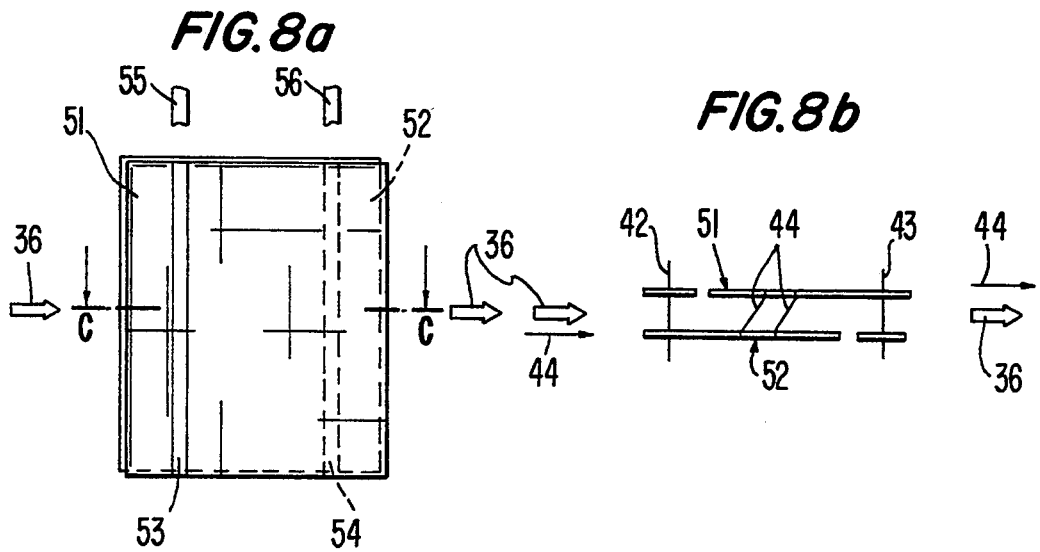

MANUFACTURE OF A CARBON PARTICLE FILTER

BACKGROUND AND SUMMARY OF THE INVENTION

The invention relates to a process for manufacturing a carbon particle filter from a porous ceramic material, which can be used to treat exhaust products of internal combustion engines and which has spaced inlet channels which open towards an exhaust gas inlet side and are separated from outlet channels which are open towards a gas outlet side.

German Patent 3,444,472 discloses a carbon particle filter whose carbon filter body consisting of porous ceramic material with a plurality of channels which extend parallel to the exhaust gas flow direction and which are alternatively sealed at the upstream or downstream end by a fitted stopper. This alternate sealing of the channels, however, is performed only on the ready-produced carbon filter body and therefore constitutes a relatively resource-intensive fabrication stop.

It is therefore the object of the invention to indicate a process for preparing a carbon particle filter from a porous ceramic material, with spaced inlet channels which open towards the exhaust gas inlet side and are apart from outlet channels which are open towards the exhaust outlet side, and without any separate alternate sealing of individual channels.

This object is achieved by having a slip-like ceramic starting material applied to a fabric having longitudinal threads extending at least in the longitudinal direction of the filter area and then layering the coated fabric to form a carbon filter body. The carbon filter body is then ceramically fired with outlet channels being produced by burning away of the longitudinal threads.

In the manufacturing process according to the invention, the position of the channels is already fixed by the arrangement of the longitudinal threads of the fabric coated with the slip-like ceramic starting material. These longitudinal threads are arranged displaced relative to one another and in line with the exhaust gas flow direction. Following the subsequent layering on top of one another or rolling up of the fabric coated with the slip-like ceramic starting material, there is present a carbon filter body in which there extend, starting from both the upstream and downstream ends, longitudinal threads which do not quite reach as far as the opposite end of the carbon filter body. During the subsequent firing process, which is used to harden the carbon filter body, the longitudinal threads, owing to their relatively low heat resistance, burn off. As a result, a carbon filter body consisting of a porous ceramic material and having the desired alternately sealed channels is obtained. Consequently, any subsequent and expensive sealing of individual channels is dispensed with.

The connection between the longitudinal threads is in the form of transverse threads which consist of a material whose burn-off temperature is above the firing temperature of the carbon filter body. This has the advantage that during the layering of the coated fabric there always remains a minimum distance between individual longitudinal threads, thereby eliminating the possibility, after these longitudinal threads have been burned away, of short-circuit formation, i.e., a connection between a channel open towards the upstream side and a channel open towards the downstream side.

There is an advantage in arranging whole layers of fabric coated with the slip-like ceramic starting material displaced relative to one another in the exhaust gas flow direction and then placing these layers in a layered arrangement. Here, not only the longitudinal threads, but also the transverse threads, can consist of one and the same material which has a low heat resistance. Such layers or mats of fabric consisting of one material are relatively inexpensive. In this case, the transverse threads are burned away as well. This is of no importance since between the individual layers of fabric, arranged displaced relative to one another, there are no connections whatsoever in the form of any transverse threads. Thus, the transverse threads in each and every instance interconnect only those longitudinal threads connected to one and the same end of the carbon filter body.

Providing the longitudinal, and optionally the transverse threads, with a rough surface has the effect that after the threads have been burned away, the individual channels likewise have an enlarged surface area and consequently ensure an improved gas transfer through the porous ceramic material. In addition, an enlarged channel surface area gives an increase in the carbon particle storage capacity.

An additional reduction in the level of pollutants in the exhaust gas, in particular hyrdrocarbon, nitrogen oxide and carbon monoxide portions, is obtained by providing the longitudinal threads with a catalytic coating.

Unlike a conventional manufacturing process for the carbon filter body by extrusion, the process according to the invention has the advantage that it is possible to use any desired "slip-capable" materials, for example aluminum dioxide or aluminum titanate.

Also, the process can utilize at least two layers of coated fabric which are placed on top of one another displaced relative to one another in the exhaust gas flow direction and then wound up to form a carbon filter body. Here, prior to the winding operation, a protruding end of a fabric layer is rolled or laid over in the direction of another fabric layer in such a way that this end comes to lie in a plane with the other fabric layer and at an interval therefrom. Likewise, the protruding end of the other fabric layer is rolled or laid over the first fabric layer in such a way that this latter end comes to lie in a plane with the first fabric layer and is at an interval therefrom. The space defined by the intervals is then filled with the ceramic starting material.

Alternative to the folding over process, one can place an additional fabric layer where the rolled over end would lie and have it be substantially flush with the end of an adjacent fabric layer and have it coated with slip-like ceramic starting material. This multilayered, four-piece composite is then rolled up prior to the firing.

Another alternative for at least two fabric layers guided on top of one another without any off-set therebetween is to remove a fabric strip at the end of each layer and perpendicularly to the exhaust gas flow direction. One fabric strip is removed in the area of the upstream end of one of the fabric layers, the other fabric strip is removed in the area of the downstream end of the other fabric layer. Subsequently all the fabric layers are coated with the slip-like ceramic starting material and wound up to form a carbon filter body.

One can provide different directions for flow through the filter by placing each layer at right angles to the layer below it.

The fabric can be formed by a mesh of longitudinal threads and transverse threads which extends transversely thereto to keep the longitudinal threads spaced apart. The longitudinal threads are made from a material whose burn-off temperature is equal to or below the firing temperature of the carbon filter body while the transverse threads consist of a material whose burn-off temperature is above this firing temperature.

When the filter is formed from a multilayered composite, the longitudinal and transverse threads can both be made of a material whose burn-off temperature is equal to or below the firing temperature of the carbon filter body.

The longitudinal threads can be located in a film or matting which dissolves during the process of layering. Also, the longitudinal threads can be sheathed with a gas-permeable material which acts as a spacer and the burn-off temperature of which is above the firing temperature of the carbon filter body. The area of the channels can be increased by having the longitudinal threads be made wavy. The longitudinal threads can consist of organic fibers or of man-made fibers.

It is advantageous if the fabric is formed by a network of transverse threads and longitudinal thread loops. The loops should alternatively start from the inlet and the outlet sides and reach up to at most the penultimate transverse thread.

The longitudinal threads and alternately the transverse threads have roughened surfaces. To ensure the performance of the filter, the longitudinal threads can be catalytically coated. Also, the cross-section of the channels open toward the upstream side can be made greater than the cross-section of the channels open towards the downstream side.

The fabric can be made as a fleece and the fleece can be perforated.

Other objects, advantages and novel features of the present invention will become apparent from the following detailed description of the invention when considered in conjunction with the accompanying drawings.

BRIEF DESCRIPTION OF THE DRAWINGS

FIG. 1 shows part of an exhaust gas line with a carbon filter body manufactured according to the invention, in a cross-sectional representation;

FIG. 2 shows the manufacture of a carbon filter body by the process according to the invention, in a perspective representation;

FIG. 3 shows the manufacture of a carbon filter body by a further variant of the process according to the invention, in a perspective representation;

FIGS. 6a and 6b show an advantageous variant of the manufacturing process shown in FIG. 3;

FIGS. 7a and 7b show a further advantageous variant of the manufacturing process shown in FIG. 3;

FIGS. 8a and 8b show a further advantageous variant of the manufacturing process shown in FIG. 3.

DETAILED DESCRIPTION OF THE DRAWINGS

Figure 4:
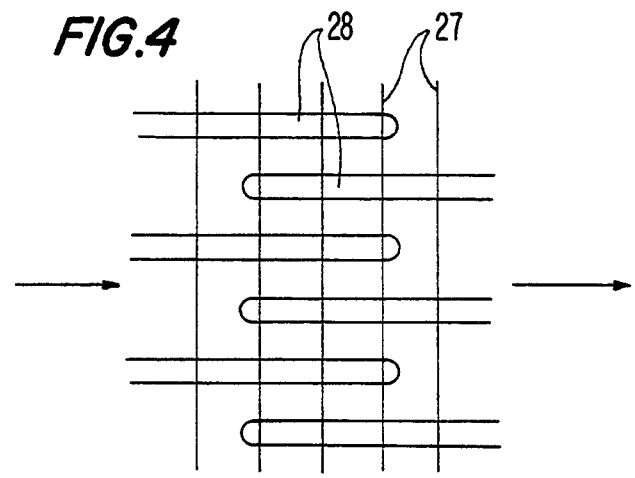
FIGS. 4 and 5 show two possible advantageous refinements of the fabric layer.

FIG. 1 shows part of an exhaust gas line 1 from a diesel engine (not shown), into which there has been inserted a cylindrical carbon filter body 2 which consists of a porous ceramic material and which has a plurality of longitudinal channels 3 and 4 which are alternately sealed at the upstream end 5 or at the downstream end 6. The exhaust gas, which flows in the direction of arrow 7, carries along carbon particles 8 which enter the carbon filter body 2 via the longitudinal channels 3 which are open towards the upstream side 5. These channels are sealed at their downstream side 6, the exhaust is forced to pass through the porous ceramic material of the carbon filter body 2 into the longitudinal channels 4 via the porous channel wall. The channels 4 are open towards the downstream side 6. However, the carbon particles 8, owing to their large diameter, are not able to pass through the porous channel wall with the exhaust and thus are retained in the longitudinal channels 3 which are open towards the upstream side 5 and are burned off from time to time by a burner or the like (not shown). The exhaust gas (arrow 9) leaving the carbon filter body 2, is thus free of carbon particles.

The carbon filter body 2 of FIG. 1 is manufactured in a manner according to the invention as shown in FIG. 2. First a mesh 10 of parallel longitudinal threads 3' and 4' and transverse threads 11, which keep the former threads spaced apart, is coated with a slip-like starting material 12 which will become the carbon filter body 2. These longitudinal threads 3', 4' are arranged displaced relative to one another in the flow direction of the exhaust gases (arrows 7 and 9) by the interval (a). This coated fabric is then wound up about the axis 13, predetermined by the exhaust gas flow direction, as a result of which the carbon filter body 2 assumes a cylindrical shape. After the carbon filter body 2 has been stiffened and dried, it is fired in a further operation. This firing gives the filter body 2 its porosity and strength. The longitudinal threads 3' and 4' consist of a material whose burn-off temperature is below the firing temperature of the ceramic material of the carbon filter body 2. By contrast, the burn-off temperature of the transverse thread material is slightly above this firing temperature. Consequently, during firing the longitudinal threads 3' and 4' burn away, forming the longitudinal channels 3 and 4 in the arrangement described in FIG. 1. Since the transverse threads 11 consist of a heat-resistant material, they remain in the carbon filter body and hence prevent any short-circuiting of two adjacent longitudinal threads 3' and 4'.

The surface of the longitudinal threads 3' and 4' is then roughened to obtain an improved gas transfer in the carbon filter body 2 and an increased carbon particle storage capacity. In addition, the longitudinal threads 3' and 4' can be provided with a catalytic coating.

FIG. 3 shows a further way of manufacturing a carbon filter body 14 in a manner according to the invention. Two layers of fabric 15 and 16, each comprising a mesh of parallel longitudinal threads 17 and 18 which are not longitudinally displaced and parallel transverse threads 19 and 20, are both coated with a slip-like ceramic starting material 21 in the manner shown. These two layers of fabric 15 and 16 are arranged displaced relative to one another by the interval (a) in the exhaust gas flow direction (arrow 22). The two layers of fabric 15 and 16, i.e., in this case not only the longitudinal threads 17 and 18 but also the transverse threads 19 and 20, consist of a material whose burn-off temperature is below the firing temperature required for hardening the ceramic material 21. The two coated layers of fabric 15 and 16 are rolled up in a subsequent operation in the manner shown in FIG. 3 about the longitudinal axis 23 dictated by the exhaust gas flow direction to give a cylindrical carbon filter body 14. Again, after stiffening and drying, this carbon filter body 14 is fired, and the two layers of fabric 15 and 16 completely burn away. The process of firing thus produces a porous carbon filter 14 with two channel meshes, of which one is open via the longitudinal channels formed from the longitudinal threads 18 only to the upstream side 24, and the other is open via the longitudinal channels formed from the longitudinal threads 17 to the downstream side 25. The exhaust gas which carries along the carbon particles and flows into the longitudinal channels caused by threads 18 in this illustrative embodiment, also flows from these longitudinal channels into the transverse channels formed by the transverse threads 20 and must, in order to be able to pass into the channel network on the outlet side, flow through the porous ceramic layer 26 lying between the two channel networks. In the course of this passage through the porous ceramic layer 26, the entrained carbon particles are retained in the channel mesh formed by the mesh 16, where they are burned off from time to time by a burner or the like (not shown). It is, of course, also possible to use transverse threads made of a heat-resistant material. In this illustrative embodiment also, the threads of the fabric, including the transverse threads, have been provided with a toughened surface. A catalytic coating is also possible. Instead of the layers of fabric 15 and 16, it is also possible to use a fleece which can be burned away and which has a plurality of holes through which the slip-like starting material enters and which must always interconnect two ceramic layers at a time and thus provides a support for the channels formed, which are annular in this case.

During the winding or layering of the coated fabric, the longitudinal threads 3', 4' (FIG. 2) or fabric layers 15 and 16 (FIG. 3) are displaced closer towards the front end 5 of the carbon filter body 2 or 14, and can be enveloped by the ceramic starting material, so that the longitudinal channels formed in the course of the firing of the filter body 2 or 14 remain sealed. This enveloping can also occur at rear end 6. To prevent this, narrow slices are cut off after firing, from both front ends 5 or 24, and/or rear ends 6 or, 25 of the fired filter body 2 or 14. Care must only be taken here to ensure that one does not remove so much material that a longitudinal thread 3' or 4', or the fabric layer 15 or 16 directly interconnects both side surfaces 5 and 6, or 24 and 25 of the carbon filter body.

The slip-like ceramic starting material 12 or 21 is an aluminum titanate with water. To improve the shapeability of the starting material, it is mixed with an organic binder. After firing, the microporosity of the starting material is below 1 $\mu$m. By adding an appropriate burnable powder (particle size 1 $\mu$m) there exists an additional way of effecting the porosity. It is also possible to use other materials suitable for the manufacture of carbon filters (for example, cordierite, aluminum oxide ($Al_2O_3$) etc.). The burnable fabric threads 3', 4' and 15, 16 consist of man-made fibers, although the use of organic fibers is also conceivable.

In a further refinement of the invention, it is possible to manufacture the carbon filter body 2 or 14 not by winding, but by simply placing a plurality of coated individual layers, one on top of another. It is also possible to wind to shapes other than cylindrical ones (e.g., elliptical or triangular based shape).

To be able to keep the longitudinal threads spaced apart during the winding or layering, it is also conceivable to affix the longitudinal threads to a thin film instead of using transverse threads. This film when it fulfills its duty, dissolves in the moisture of the slip-like ceramic starting material without leaving a residue. In this case, auxiliary threads made of a high-strength material, for example plastic threads, are necessary on both sides of the winding film in order to transfer the winding forces. However, these auxiliary threads lie within an area of the carbon filter winding body which later on will be separated off anyhow to obtain two planar side surfaces. Instead of transverse threads the longitudinal threads can also be sheathed with a heat-resistant and gas-permeable material to prevent any short-circuiting.

Similarly, FIG. 4 shows a mesh of transverse threads 27 and longitudinal thread loops 28 each starting alternately from the off-flow and the on-flow side and each reaching up to at most the penultimate transverse thread. The longitudinal thread loops need not necessarily each extend as far as the penultimate transverse thread, they can also be shorter.

An additional surface area enlargement and hence a further improvement in exhaust gas transfer area within the porous ceramic material can be obtained if the longitudinal and optionally transverse threads are wavy lengthwise instead of straight as shown.

Figure 5:
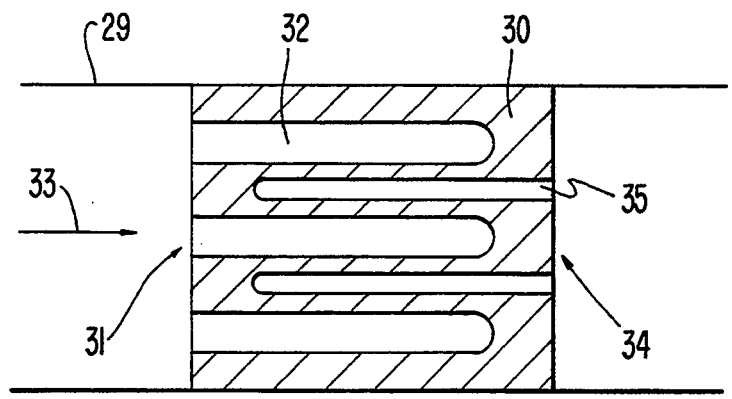

In a further refinement of the invention, it is also conceivable for the longitudinal threads and optionally the transverse threads to be of different thicknesses. For instance, FIG. 5 shows an exhaust gas line 29 with a carbon filter body 30 manufactured according to the invention, whose channels 32 which are open towards the upstream side 31 (exhaust gas flow direction, arrow 33) have a greater cross-section than the channels 35 which are open towards the downstream side 34. This measure also serves to increase the carbon particle storage capacity.

For ease of illustration of the embodiments shown in the drawings, the distance between the individual threads has, for clarity, been made relatively large compared with the overall dimensions of the carbon filter body, but in reality it is of course significantly smaller.

In the manufacture of the carbon filter body as shown in FIG. 3, the fact that the individual fabric layers are arranged mutually displaced in the exhaust gas flow direction is responsible for the fact that in the areas of offset, i.e., at the carbon filter body ends upstream and downstream relative to the exhaust gas flow direction, small changes occur in the diameter after winding up and firing, so that the diameter of the carbon filter body after manufacture is somewhat smaller in these areas than in the central area where two fabric layers are on top of one another prior to the winding operation. This is of course also true of a layered carbon filter body, where the offset of the individual fabric layers is responsible for the fact that, after the layering and firing, there are correspondingly smaller layer heights in the edge areas than in the central area.

The manufacturing variants shown in FIGS. 6 through 8 make it possible to manufacture a perfectly cylindrical carbon filter body or a carbon filter body of constant layer height under these offset conditions.

FIG. 6a shows a plan view of two previously slip-coated fabric layers 37 and 38 lying on top of one another, displaced in the exhaust gas flow direction (arrows 36), and of the type used in the manufacture of a carbon filter body to be wound of FIG. 3. For simplicity, the representation of the fabric layers in FIGS. 6a, 7a and 8a omit the accurate representation of the individual longitudinal and transverse threads.

FIG. 6b shows a section through FIG. 6a along the line A—A. The section has been placed in such a way that precisely two longitudinal threads 37' and 38' placed on top of one another with off-set become visible. The proposal then is that the upstream-protruding end 39 of the lower fabric layer 37 be added or laid over in the direction of the upper downstream-protruding fabric layer 38 in such a way that the rolled or laid over area end 39 comes to lie in a plane with the downstream protruding fabric layer 38 and is at an interval 40 therefrom. The gap is having been filled with the slip-like starting material. This adding or laying-over of the end 39 of the fabric layer 37 is represented in FIG. 6b by the dot-dashed end 39' of the longitudinal thread 37'. Similarly, the downstream-protruding end 41 of the upper fabric layer 38 is rolled or laid over in the direction of the upstream-protruding lower fabric layer 37 in such a way that this rolled or laid over end 41' comes to lie in a plane with the upstream-protruding fabric layer 37 and is at an interval 42 therefrom. Then, this gap is filled with the slip-like ceramic starting material. The laying-over of the end 41 of fabric layer 38 is represented in FIG. 6b by the dot-dashed end 41' of the longitudinal thread 38'. In the representation of FIG. 6a, the two ends 39 and 41 have not as yet been rolled or laid over. The laying over of the two ends 39 and 41 is followed as in FIG. 3 by the manufacture of the carbon filter body by winding up and the subsequent burning away of the fabric layers 37 and 38.

For the same reasons, as in the manufacturing process shown in FIG. 3, two narrow slices are cut off at the two end faces along lines 42 and 43, of the carbon filter body after the fabric layers have been burned away. The result is a carbon filter body where the exhaust gas flow, with its carbon particles, enters via a channel formed by the longitudinal threads 37' (see FIG. 6b), but where these longitudinal threads 37' are closed off on the downstream side to the carbon particles by the slip-filled interval 42, so that the carbon particles are held back in the channels formed by the longitudinal threads 37' and the cleaned exhaust gas stream finally flows through the porous ceramic material (slip after firing) present between the fabric layers 37 and 38 into the channels formed by upper longitudinal threads 38' and exits along the direction of arrows 44. These upper longitudinal threads 38' are open towards the downstream side. The carbon particles are prevented from escaping unremoved via the upper longitudinal threads 38' of the carbon filter body by the slip-filled interval 40. Prior to winding, there are thus two fabric layers on top of one another, present not only in the central region, but also at the two ends 39 and 41, so that the winding and firing operation leaves a carbon filter body having a constant diameter over its entire length. Similarly, this process makes it possible to manufacture a layered carbon filter body of constant layer height. In this case, the two ends are always laid over after two coated fabric layers have been placed on top of one another.

A further possible way of obtaining a wound carbon filter body of constant diameter over its entire length or a layered carbon filter body of constant layer height is shown in FIGS. 7a and 7b. FIG. 7a again shows two fabric layers 45 and 46, as used in the manufacturing process of FIG. 3, which have been placed on top of one another and have previously been coated with the slip-like ceramic starting material. Similar to the illustrative embodiment of FIGS. 6a and 6b, the second figure (FIG. 7b) is a section through the first figure (FIG. 7a), specifically along the line B—B. The section likewise extends at the level of two longitudinal threads 45' and 46' placed on top of one another with off-set. According to the invention herein, it is proposed that two like slip-coated additional fabric layers 47 and 48 are wound up as well, after one of them 48 has been placed at an interval 49 against the end 64 overlapped by the adjacent fabric layer 46 and the other 47 at an interval 50 against the end 65 overlapped by the adjacent fabric layer 45. The two intervals 49 and 50 have again been filled with the slip material. The additional fabric layer 48 is flush with the fabric layer 46 and the additional fabric layer 47 is flush with the fabric layer 45. The off-set of the two fabric layers 45 and 46 in this illustrative embodiment is the same at both ends. It is of course also possible to make this off-set different at the two ends. In this case, the width of the additional fabric layers must be adapted accordingly.

After the winding operation and the burning away of all the fabric layers 45, 46, 47 and 48, the result is again a carbon filter body where the same conditions apply as with the carbon filter body manufactured according to FIGS. 6a and 6b. Here too, the slip material, more correctly the porous ceramic material produced by the process of firing/burning away the fabric material from the slip material including the slip material positioned between the additional fabric layers 48 and 47 and the corresponding fabric layers 45 and 46 respectively, ensures that the carbon particles present in the exhaust gas stream are filtered out along the direction of arrows 44. At the same time, the carbon filter body again has constant diameter over its entire length.

To be able to realize a layered carbon filter body of constant layer height, all that is necessary for firing, is simply to place a plurality of layers as shown in FIGS. 7a and 7b on top of one another.

A third variant for manufacturing a wound carbon filter body of constant diameter over its entire length is shown in the two FIGS. 8a and 8b (FIG. 8b again being a section through FIG. 8a along the line C—C similarly to FIGS. 6a, 6b, 7a and 7b). Here it is proposed to first guide two fabric layers 51 and 52 over one another without off-set and then to remove from each of these two fabric layers 51 and 52, in each case perpendicularly to the exhaust gas flow direction (arrows 36), a fabric strip 53 or 54. One of these fabric strips 53 being removed in the area of the upstream end of the upper fabric layer 51 and the other fabric strip 54 being removed in the area of the downstream end of the lower fabric layer 52. Fabric strips 53 and 54 may each be cut out, for example, with a suitable knife 55 or 56. Thereafter, all the fabric layers are coated with the slip material even before the fabric strips are removed. Care only needs to be taken in this case to subsequently fill the intervals left by the removal with slip material. After the fabric layers have been burned away, the same conditions are present in the carbon filter body manufactured in accordance with FIGS. 7a and 7b.

This process can be used for manufacturing a layered carbon filter body. For instance, in this case from each of the fabric layers to be layered there is likewise always removed one fabric strip, the fabric strip always being removed alternately in one fabric layer in the area of the upstream end and in the adjacent fabric layer in the area of the downstream end.

Figure 9:
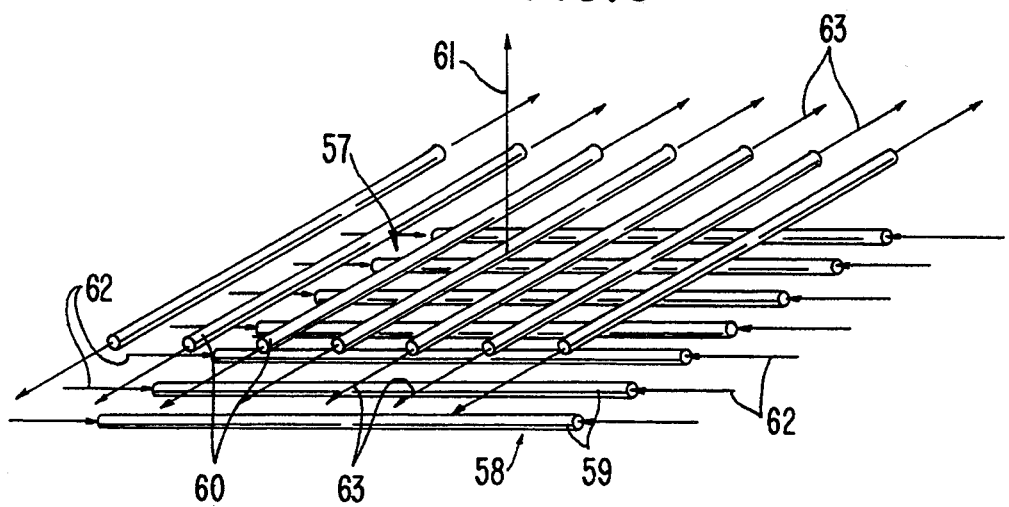
FIG. 9 shows the manufacture of a carbon filter body by a further variant of the process according to the invention.

FIG. 9 shows a further process for manufacturing a layered carbon filter body. Here individual coated fabric layers which consist of burnable longitudinal threads and non-burnable transverse threads, keeping the longitudinal threads apart, are placed on top of one another. For clarity, FIG. 9 shows only two fabric layers 57 and 58, and of these only the longitudinal threads 59 and 60. This manufacturing process then proposes to layer the individual layers of coated fabric, twisted with respect to one another by 90° relative to the layering direction 61. This provides a means for deflecting the gas stream by 90°.

If the inlet and outlet channels formed by the burning away of the longitudinal threads 59 and 60 (the longitudinal threads 59 forming inlet channels; the longitudinal threads 60 forming outlet channels) remain open on both sides, the carbon filter body may be subjected to two oncoming streams (arrows 62) and similarly the exhaust gas flows off again in two streams (arrows 63). By alternatively sealing one side of each the inlet or outlet channels at one end, it is also possible to re-establish single-stream conditions at each inlet or outlet.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A process for manufacturing from a layered or woven porous ceramic material a carbon particle filter with inlet channels which open toward an off-flow side of the filter spaced from the inlet channels, comprising the steps of applying a coating of slip-like ceramic starting material to a fabric having longitudinal threads which extend at least in the longitudinal direction of the filter and are displaced with respect to one another by a spaced interval in the longitudinal direction such that an end of alternate ones of the longitudinal threads are offset from an end of adjacent longitudinal threads by the spaced interval, as viewed transversely to the longitudinal direction, forming the carbon filter body by layering the coated fabric, and then ceramic firing the carbon filter body to burn away the longitudinal threads to produce the inlet and outlet channels.

2. A process for manufacturing from a layered or wound process ceramic material a carbon particle filter with inlet channels which open toward an exhaust gas on-flow side of the filter and outlet channels which open toward an off-flow side of the filter spaced from the inlet channels, comprising the steps of coating at least two layers of a fabric with a slip-like ceramic starting material, placing the at least two layers one on top of the other with a displacement therebetween as viewed in an exhaust flow direction, winding the layers up so as to be displaced relative to one another by a spaced interval in the exhaust gas flow direction to form a carbon filter body, and ceramic firing the carbon filter body and producing the inlet and outlet channels by burning away either longitudinal threads of the layers.

3. A process for manufacturing from a layered or wound process ceramic material a carbon particle filter with inlet channels which open towards an exhaust gas on-flow side of the filter and outlet channels which open toward an off-flow side of the filter spaced from the inlet channels comprising the steps of layering and turning individual layers of ceramic coated fabric with respect to one another by 90 degrees relative to the layering direction to form a filter body, and then firing of the filter body to produce the inlet and outlet channels by burning away individual longitudinal threads of the layer.

4. A process according to claim 2, wherein prior to the winding step, an end of one of the two fabric layers which will become an inlet of the filter, is laid over to face in the direction of what will become the outlet of the filter and to lie in a plane of the other of the two fabric layers and is spaced at an interval from an end of said other of two layers; and wherein an other end of the other of said two layers, which will face the outlet of the filter, is laid over in the direction of the one of the two fabric layers with this end coming to lie in a plane with the one of the two fabric layers and spaced at an interval therefrom.

5. A process according to claim 2, wherein the layering arrangement is obtained by having two fabric layers placed one on top of another with an upstream-protruding end of one fabric layer being laid over in the direction of the other fabric layer in such a way that this upstream-protruding end comes to lie in a plane with the other fabric layer and spaced at an interval therefrom and wherein a down-stream protruding end of the other fabric layer is laid over in the direction of the one fabric layer in such a way that this downstream-protruding end comes to lie in a plane with the one fabric layer and at an interval therefrom.

6. A process according to claim 2, wherein adjacent fabric layers are placed over opposite displaced ends of each of said two layers and at an interval from non-protruding ends of the layers that are adjacent one another, to be substantially flush with the non-protruding ends of adjacent fabric layer; and wherein these adjacent fabric layers have been coated with slip-like ceramic starting material and are wound up with the two layers of coated fabric.

7. A process according to claim 2, wherein adjacent fabric layers are placed over non-overlapped ends of each overlapped two fabric layers and at an interval from the overlapped portions of the two fabric layers and substantially flush with the overlapped portion; and wherein each adjacent fabric layer has been coated with slip-like ceramic starting material and is layered together with the two layers of coated fabric.

8. A process according to claim 2, wherein the layering arrangement is obtained from placing at least two fabric layers one on top of another without displacement off-set and wherein fabric strips are removed from the area in what will become the upstream end of one of the fabric layers and in the area of what will become the downstream end of the other of the two fabric layers; and wherein subsequently all fabric layers are coated with the slip-like ceramic starting material and are then wound up to form a carbon filter body.

9. A process according to claim 2, wherein fabric strips are removed from each of the two fabric layers, which strips extend perpendicularly to what will become the exhaust gas flow direction and wherein at least one fabric strips is removed at what will become the upstream end of one of the fabric layers and at least one fabric strip is removed from what will become the downstream end of the other of the two layers; and wherein that subsequently all the fabric layers are coated with the slip-like ceramic starting material prior to being layered to form a carbon filter body.

10. A process according to claim 1, wherein the fabric is formed by a mesh of longitudinal threads and transverse threads which extend at right angles to one another;
   the longitudinal threads being spaced apart from one another;
   the longitudinal threads being formed from a material whose burn-off temperature is equal to or below the firing temperature of the carbon filter body, and the transverse threads consisting of a material whose burn-off temperature is above this firing temperature.

11. A process according to claim 2, wherein the fabric is formed by a mesh of longitudinal threads and transverse threads which extend transversely to one another;
   the longitudinal threads being spaced apart;
   the longitudinal and transverse threads being formed from a material whose burn-off temperature is equal to or below the firing temperature of the carbon filter body.

12. A process according to claim 1, wherein the longitudinal threads have been applied to a film which dissolves during the process of layering.

13. A process according to claim 1, wherein the longitudinal threads are sheathed with a gas-permeable material which acts as a spacer and the burn-off temperature of which is above the firing temperature of the carbon filter body.

14. A process according to claim 1, wherein in that fabric is formed by a network of transverse threads and longitudinal thread loops at right angles thereto and wherein the thread loops alternate from what will become the inlet-flow and the outlet-flow side and extend therefrom up to at most the penultimate transverse thread at the opposite side.

15. A process according to claim 1, wherein the longitudinal threads are formed slightly wavy.

16. A process according to claim 1, wherein the longitudinal threads are made from at least one of an organic fiber and a man-made fiber.

17. A process according to claim 1, wherein either the longitudinal threads or the transverse threads are formed with a toughened surface.

18. A process according to claim 1, wherein the longitudinal threads are catalytically coated.

19. A process according to claim 1, wherein a cross-section of the longitudinal threads that will open toward what will be the upstream side, are made greater than a cross-section of the longitudinal threads that will be open toward the downstream side.

20. A process according to claim 2, wherein the fabric is formed from fleece.

21. A process according to claim 20, wherein fleece is perforated.

22. A process according to claim 2, wherein the fabric is formed by a mesh of longitudinal threads and transverse threads which extend at right angles to one another;
   the longitudinal threads being spaced apart from one another;
   the longitudinal threads being formed from a material whose burn-off temperature is equal to or below the firing temperature of the carbon filter body, and the transverse threads consisting of a material whose burn-off temperature is above this firing temperature.

23. A process according to claim 2, wherein the longitudinal threads have been applied to a film which dissolves during the process of layering.

24. A process according to claim 2, wherein the longitudinal threads are sheathed with a gas-permeable material which acts as a spacer and the burn-off temperature of which is above the firing temperature of the carbon filter body.

25. A process according to claim 2, wherein that fabric is formed by a network of transverse threads and longitudinal thread loops at right angles thereto and wherein the thread loops alternate from what will become the inlet-flow and the outlet-flow side and extend therefrom up to at most the penultimate transverse thread at the opposite side.

26. A process according to claim 3, wherein the longitudinal threads have been applied to a film which dissolves during the process of layering.

27. A process according to claim 3, wherein the longitudinal threads are sheathed with a gas-permeable material which acts as a spacer and the burn-off temperature of which is above the firing temperature of the carbon filter body.

28. A process according to claim 3, wherein that fabric is formed by a network of transverse threads and longitudinal thread loops at right angles thereto and wherein the thread loops alternate from what will become the inlet-flow and the outlet-flow side and extend therefrom up to at most the penultimate transverse thread at the opposite side.

29. A process according to claim 2, wherein the longitudinal threads are formed slightly wavy.

30. A process according to claim 2, wherein the longitudinal threads are made from at least one of an organic fiber and a man-made fiber.

31. A process according to claim 2, wherein either the longitudinal threads or the transverse threads are formed with a roughened surface.

32. A process according to claim 2, wherein the longitudinal threads are catalytically coated.

33. A process according to claim 2, wherein a cross-section of the longitudinal threads that will open toward what will be the upstream side, are made greater than a cross-section of the longitudinal threads that will be open toward the downstream side.

* * * * *